United States Patent [19]

Cleary

[11] 3,720,202

[45] March 13, 1973

[54] INSTRUMENT FOR MEASURING MAXIMUM EXPIRATORY FLOW RATE

[76] Inventor: James M. Cleary, P.O. Box 541, Falmouth, Mass. 02541

[22] Filed: Oct. 5, 1971

[21] Appl. No.: 186,663

[52] U.S. Cl. ............................................. 128/2.08
[51] Int. Cl. ......................... A61m 16/00, A61b 5/08
[58] Field of Search ...... 73/205 L, 419, 146.3, 146.8, 73/263; 128/2.08

[56] References Cited

UNITED STATES PATENTS

| | | | |
|---|---|---|---|
| 51,002 | 11/1865 | Barnes | 128/2.08 |
| 471,389 | 3/1892 | Lacey | 73/419 |
| 793,177 | 6/1905 | Cady | 128/2.08 |
| 1,336,104 | 4/1920 | Stone | 73/419 |
| 2,853,880 | 9/1958 | Redding | 73/419 |
| 3,407,644 | 10/1968 | Yasunami | 73/4 |

Primary Examiner—Aldrich F. Medbery
Attorney—Charles F. Steininger

[57] ABSTRACT

An instrument for measuring maximum expiratory flow rate having a vertically disposed cylinder with a plurality of equal sized orifices distributed along its length, a floating piston disposed in the cylinder having a guide rod passing through a closure on the top of the cylinder, a holdback clip mounted on the cylinder closure and operatively engaging the guide rod to prevent the guide rod from moving downwardly once the piston has moved upwardly in the cylinder and a suitable, flexible air tube having a mouthpiece at one end and connected in open communication with the bottom of the cylinder at its other end. The instrument can also be provided with a check valve at the lower end of the cylinder to prevent backflow of air through the air tube and adjustable port means adjacent the base of the cylinder to adjust the range of the instrument.

8 Claims, 2 Drawing Figures

INVENTOR
JAMES M. CLEARY

BY Charles F. Steininger
ATTORNEY

INSTRUMENT FOR MEASURING MAXIMUM EXPIRATORY FLOW RATE

BACKGROUND OF THE INVENTION

The present invention relates to an instrument for measuring maximum expiratory flow rate. More specifically, the present invention relates to an instrument for measuring the conductivity of the respiratory system of a patient in the diagnosis of asthma and other respiratory diseases.

In the diagnosis of asthma and other respiratory diseases, the conductivity of the respiratory system is a useful parameter. Consequently, this conductivity of the respiratory system can be indirectly measured by measuring the maximum expiratory flow rate of the patient.

Heretofore, instruments for measuring maximum expiratory flow rate have been complicated and expensive. In addition, such complex instruments have an adverse psychological effect when a patient being treated is a child. Because of the complexity and size of these instruments, the child may view the test as a frightening experience.

It is therefore an object of the present invention to provide a simple, effective and inexpensive instrument for measuring maximum expiratory flow rate of a patient. In a more specific aspect, the present invention provides an instrument for testing the maximum expiratory flow rate, particularly of children. In a more specific object of the invention, an instrument is provided which can be viewed as a game by the child in that the child can see the effect of his efforts and try to improve on this effort in subsequent tests.

SUMMARY OF THE INVENTION

The present invention comprises an instrument for measuring the maximum expiratory flow rate of a patient in which a vertically disposed cylinder is provided with a plurality of equal size orifices distributed along its length, a free floating piston disposed in the cylinder and adapted to move upwardly as air is forced into the cylinder from the bottom, a guide rod mounted on the top of the piston and passing through a closure at the top of the cylinder, a holdback means, adapted to prevent the piston from freely moving downwardly in the cylinder, mounted on the top of the cylinder and operatively associated with the guide rod and an air tube in open communication with the bottom of the cylinder.

DESCRIPTION OF THE PREFERRED EMBODIMENTS

Figure 2:
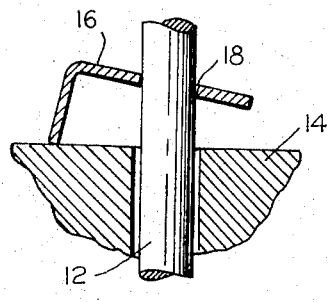
FIG. 2 is a detailed view partially in section of the holdback means of the instrument of FIG. 1.
Figure 1:
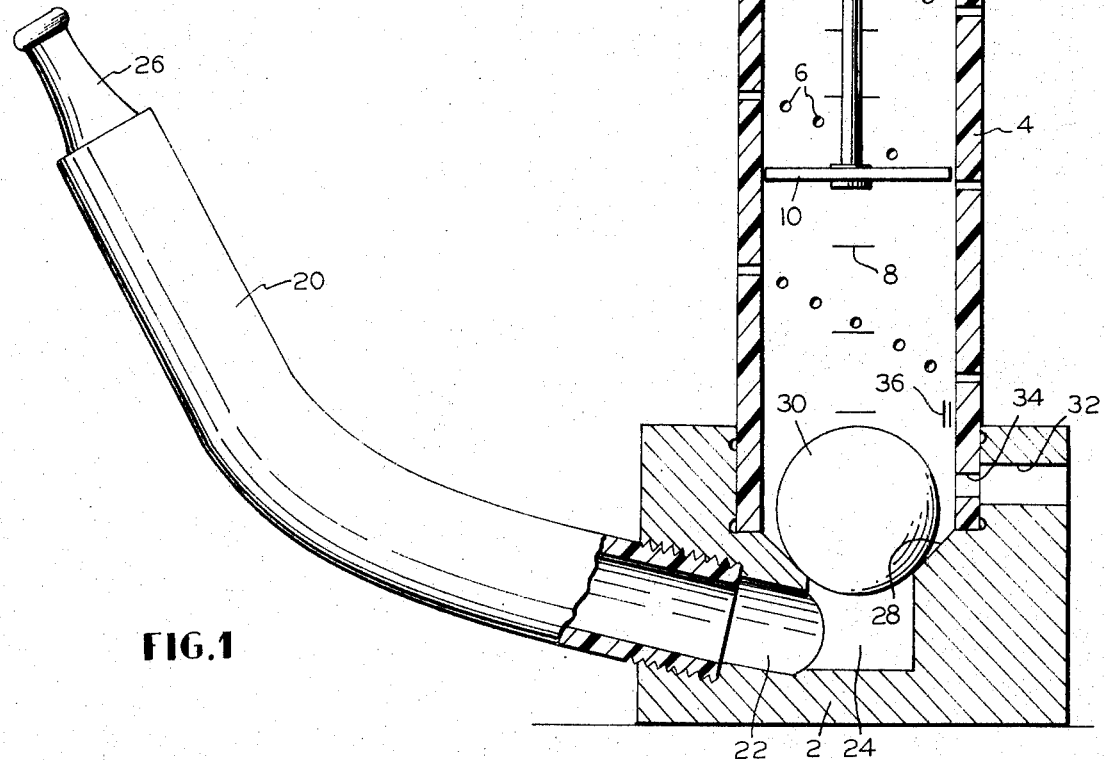
FIG. 1 is an elevational view of the instrument of the present invention partially in section.

In accordance with the drawings, a suitable base having sufficient bulk to support the entire instrument is provided. Mounted in an opening at the top of base 2 is an orifice cylinder 4. Orifice cylinder 4 has a uniform central bore and a multiplicity of equal sized orifices 6 passing through the wall of orifice cylinder 4. Orifice cylinder 4 is preferably made of a clear plastic material so that the operation of the device can be observed from the exterior, and the cylinder itself may be provided with appropriate calibration marks 8 along its length. The piston 10 applies a constant back pressure to the orifices as it moves upward. Therefore, if orifices 6 are of equal size, the flow rate, $Q$, is a straight line function of the number of orifices exposed to the flow, $N$. Calibration of the instrument therefore amounts to determining a constant $K$ for the instrument such that $$Q = KN \qquad (1)$$

It is convenient to place a calibration mark between each group of 10 holes to facilitate the hole count. Mounted within cylinder 4 is an appropriate free floating piston 10. Extending upwardly from piston 10 is piston guide rod 12. Piston guide rod 12 passes through guide bushing 14 which also serves as a closure for the top of cylinder 4. Thus, by calibrating cylinder 4 by means of calibration marks 8, one can observe the position of piston 10 with a relation to the calibration marks 8. Alternatively, guide rod 12 can be provided with suitable calibration marks, and the relation of these marks to guide bushing 14 can be observed. In this case, the orifice cylinder 4 need not be transparent. In order to prevent piston 10 from moving downwardly of its own weight once it has been moved to an upper position, a holdback clip 16 is mounted on guide bushing 14 having an aperture 18 which passes over guide rod 12. Consequently, since holdback clip 16 is inclined slightly from the horizontal, the guide rod 10 moves freely upwardly through the aperture 18 but, with a slight downward movement of the guide rod, the clip 16 will tilt downwardly causing the rod 12 to bind in the aperture 18 and thus prevent the rod from moving downwardly unless the clip 16 is pulled upwardly by the operator to release the rod.

A suitable, flexible plastic tube 20 is mounted in base 2 just below the bottom of orifice cylinder 4. Tube 20 is in open communication with orifice cylinder 4 through air aperture 22 and air chamber 24 formed in the base. Flexible air tube 20 is preferably provided with a disposable mouth piece 26 into which the patient blows.

As a sanitary precaution, the base 2 may have formed therein a valve seat 28. This valve seat 28 cooperates with a lightweight ball 30 disposed within orifice cylinder 4, and the seat and ball 28 and 30, respectively, form an appropriate check valve to prevent reverse flow of air from orifice cylinder 4 through tube 20. Ball 30 may appropriately be a conventional ping pong ball or the like.

Since maximum expiratory flow rates vary over a wide range, it is also desirable to provide means for changing the range of the instrument. This means for shifting the range of the instrument may simply comprise an aperture 32 through base 2 which cooperates with an aperture 34 in the wall of orifice cylinder 4. Orifice cylinder 4 may be turned or twisted in base 2 to thereby open or close aperture 34. The means for shifting the range of the instrument must also be calibrated. Marks 36 may be disposed circumferentially about orifice cylinder 4 and cooperate with zero marks on the top of base 2 to indicate fully open and fully closed positions. The aperture 34 is of such a size that it may be equivalent, for example, to 50 of the orifices 6. Since the pressure drop across the range shift orifice is constant while the piston moves upward, the flow rate through it, $Q_o$, is constant. When the range shift orifice is open, the flow equation for the instrument is then:

$$Q = KN\, Q_o \qquad (2)$$

Operation of the Instrument

Since the maximum expiratory flow rate of a patient exists only momentarily during expiration, the maximum reading of the device may not be obtained when the first test is conducted. Therefore, to assure that a maximum reading has been obtained, the patient being tested is allowed to perform the test 2 or more times. When the piston reaches the position corresponding to the patient's maximum expiratory flow rate, the patient will no longer be able to move the piston no matter how many times he tries.

Specifically, the patient being tested blows into the mouthpiece 26 of the instrument as rapidly as he is able. The main passages of the instrument are sufficiently large so as not to restrict the flow of air. The ball 7 is lifted from seat 28 allowing air to flow up into the orifice cylinder 4. In a specific example, the ball will weigh 1.7 gms. and be disposed within an orifice cylinder having an internal bore of 13.8 cm$^2$. The ball thus will contribute a negligable back pressure of approximately 0.12 gm./cm.$^2$. The purpose of the ball is to prevent backflow from the orifice cylinder 4 through the air tube 20. As air enters the orifice cylinder, the piston rises in the cylinder uncovering successive orifices. Finally, as sufficient orifices are uncovered by the piston, these orifices will accommodate the entire flow of air under the back pressure imposed by the weight of the piston. For example, if the piston weighs 55 gms., the pressure inside the cylinder required to elevate the piston is then 4 gms./cm.$^2$. The piston therefore moves upwardly until a sufficient number of orifices have been passed by the piston to accept the entire flow rate at 4 gms./cm.$^2$ pressure differential. As previously indicated, the holdback clip 16 permits the piston 10 and the piston guide rod 12 to move upwardly freely but prevents the guide rod and piston from moving downwardly. The piston and guide rod may, of course, be permitted to move to their lowermost position by simply lifting the spring-type clip 16 upwardly.

While a specific device has been described herein having specific elements and features, it is to be understood that these illustrations are to be non-limiting and that the present invention is to be limited only in accordance with the appended claims.

I claim:

1. Apparatus for measuring a patients maximum expiratory flow rate, comprising; a cylinder having a central bore of equal diameter throughout its length, one end thereof closed and a plurality of equal-diameter orifices passing through the wall of said cylinder and spaced along the length of said cylinder; piston means disposed in said central bore of said cylinder; guide rod means having one end thereof attached to said piston and slidably passing through said closed end of said cylinder; holdback means mounted on said adjacent said closed end of said cylinder and releasably holding said guide rod to prevent said guide rod and piston from sliding toward the open end of said cylinder while permitting free movement of said guide rod and piston toward said closed end of said cylinder; and air tube means having one end connected in open communication with said open end of said cylinder and the other end provided with a sanitary mouth piece.

2. Apparatus in accordance with claim 1 wherein the cylinder is transparent and calibrated to indicate the piston of the piston within said cylinder.

3. Apparatus in accordance with claim 1 wherein the holdback means is a spring type clip having an aperture therethrough which the guide rod passes and is bent toward the closed end of the cylinder.

4. Apparatus in accordance with claim 1 wherein the open end of the cylinder is mounted in a base and said base has an air passage therein connecting said cylinder and the air tube.

5. Apparatus in accordance with claim 4 wherein the air passage in the base has a check valve formed therein to prevent passage of air from the cylinder to the air tube while permitting passage of air from said air tube to said cylinder.

6. Apparatus in accordance with claim 5 wherein the check valve comprises a valve seat formed in the base adjacent the open end of the cylinder and a free floating ball disposed above said seat.

7. Apparatus in accordance with claim 1 wherein the cylinder has operatively associated therewith means for changing the amount of air which can pass out of said cylinder below the piston.

8. Apparatus in accordance with claim 7 wherein the open end of the cylinder is rotatably mounted in a base and the means for changing the amount of air which can pass out of said cylinder is an orifice through the wall of said cylinder, substantially larger than the other orifices in said cylinder wall, registerable with an orifice through said base.

* * * * *